United States Patent [19]

Patel

[11] Patent Number: 4,842,770
[45] Date of Patent: Jun. 27, 1989

[54] DRILLING FLUID THINNER

[75] Inventor: Bharat Patel, Tulsa, Okla.

[73] Assignee: Phillips Petroleum Company, Bartlesville, Okla.

[21] Appl. No.: 162,835

[22] Filed: Mar. 2, 1988

[51] Int. Cl.⁴ .............................................. C09K 7/02
[52] U.S. Cl. ................................. 252/8.514; 252/8.51
[58] Field of Search ............................ 252/8.51, 8.514

[56] References Cited

U.S. PATENT DOCUMENTS

| | | | |
|---|---|---|---|
| 2,605,221 | 7/1952 | Hoeppel | 252/8.51 |
| 3,479,287 | 11/1969 | Floyd et al. | 252/8.5 |
| 3,537,991 | 11/1970 | Parker | 252/8.5 |
| 3,956,142 | 5/1976 | Wilson et al. | 252/8.5 |
| 4,404,108 | 9/1983 | Cates | 252/8.5 |
| 4,704,214 | 11/1987 | Russell et al. | 252/8.514 |

Primary Examiner—Herbert B. Guynn
Attorney, Agent, or Firm—Hal Brent Woodrow

[57] ABSTRACT

An improved aqueous drilling fluid additive comprising chromium acetate and sulfoalkylated tannins optionally in combination with lignite.

10 Claims, No Drawings

DRILLING FLUID THINNER

FIELD OF INVENTION

This invention relates to the field of drilling fluids and additives thereto.

BACKGROUND OF THE INVENTION

In the drilling of wells with rotary tools using an aqueous drilling fluid, major difficulties are caused by the penetration of natural formations. Certain formations, such as gypsum, will "cut" the drilling fluid causing particles within the drilling fluid to flocculate and the viscosity to become too high. In such instances there is danger of the drill pipe twisting in half, of gas cutting the mud, or of a blowout occurring. Another difficulty which is frequently encountered in deeper wells is gelation and/or thickening of the drilling mud due to high temperatures encountered in deep wells. In such instances the drilling mud actually gels and/or thickens and greatly increases the pump pressures required for circulating the drilling mud.

The most successful solution to these problems has been the addition of drilling additives or thinners which consist of sulfoalkylated tannins or heat treated sulfoalkylated tannins with inorganic water soluble cationic and anionic compounds of inorganic chromium (VI) and optionally lignite. Unfortunately some of these chromium (VI) compounds are potentially carcinogenic. Thus, it would be a significant contribution to the art to discover a compound which may replace inorganic chromium (VI) compounds now in use that is not as potentially carcinogenic.

OBJECTS OF THE INVENTION

An object of this invention is to provide an improved drilling fluid additive having reduced carcinogenic.

Another object of this invention is to provide improved aqueous drilling fluids which are characterized by stability under the high temperatures encountered in drilling deep wells.

Other aspects, objects, and advantages of the invention will be apparent to those skilled in the art in view of this disclosure.

SUMMARY OF THE INVENTION

I have discovered that chromium acetate, when used with sulfoalkylated tannins, which may be optionally admixed with lignite, provides a drilling fluid additive which performs as well as chromium (VI) containing additives but which avoids potentially carcinogenic chromium (VI) compounds.

DETAILED DESCRIPTION OF THE INVENTION

The additives comprise two or optionally three components. The two-component additive comprises a mixture of sulfoalkylated tannin and chromium (III) acetate and/or chromium (II) acetate. The three-component additive additionally contains a lignite component.

Chromium Acetate

The chromium acetate used in the practice of this invention is a known composition. The chromium acetate used in this invention refers to chromium acetate wherein the chromium ions have a charge density of +3 or less. The preparation of chromium acetate used in the practice of this invention is known in the art. Preferably a dry powdered or granular commercial grade of chromium (III) acetate or chromium (II) acetate will be used in the practice of this invention.

SULFOALKYLATED TANNINS

Sulfoalkylated tannins are tannin molecules which are alkylated with at least one side chain that can be represented by the formula $—C(R)_2—SO_3M$ wherein each R is selected from the group consisting of a hydrogen atom and alkyl, cycloalkyl, aryl, and alkaryl radicals, and M is ammonium or an alkali metal depending upon the particular sulfite employed. As indicated hereinafter, it is preferred when R is other than hydrogen, that said R be an alkyl group containing from 1 to 5 carbon atoms.

The sulfoalkylated tannin, either a gallotannin or a flavotannin, can be prepared by procedures already known in the art (see specifically U.S. Pat. No. 3,537,991 incorporated herein by reference). All of said procedures involve the interreaction, in an alkaline aqueous reaction medium under reaction conditions, between a tannin compound, a carbonyl compound selected from the group consisting of aldehydes and ketones, and a sulfur compound selected from the group consisting of sulforous acid and water-soluble salts thereof. Thus, in one method an alkali metal hydroxide, e.g., sodium hydroxide, an aldehyde or ketone, e.g., formaldehyde or acetone, a sulfite, e.g., sodium sulfite, or sodium bisulfite, and a tannin, e.g., quebracho (quebracho extract), are added to water in a reaction vessel to form a reaction mixture. The sequence of adding said reactants to the water is not critical. However, it is sometimes preferred to add the alkali metal hydroxide first. The amount of alkali metal hydroxide employed will be an amount sufficient to make the reaction mixture alkaline, at least initially. Said reaction mixture is then maintained under conditions of time and temperature sufficient to cause the substantial conversion of the tannin compound into a sulfoalkylated tannin.

It will be noted that in the combination drilling fluid additives of the invention that the sulfoalkylated tannin may be subjected to a heat treatment. Said heat treatment can be carried out in any suitable manner which is effective to improve the action of said additive. Methods of heat treating are known to those skilled in the art (see specifically U.S. Pat. No. 3,537,991 incorporated herein by reference).

Sulfomethylated quebracho is the presently preferred sulfoalkylated tannin.

Lignite

Any suitable lignite or lignite by-product can be used in this invention. The lignites used in this invention are preferably non-sulfoalkylated and have been pre-treated with alkali bases or "causticized" for improved water solubility. Preferred lignite used in this invention has an oxygen content of at least about 20 weight percent, usually in the range of from about 20 to about 40 weight percent, measured on a dry basis. Lignitic materials which are high in humic acids, thus readily soluble in basic solution, ae most preferred. Presently preferred is leonardite, which is characterized by its high oxygen content and increased alkali solubility. The solubility of leonardite is greater than that of conventional lignite. As an example, a typical solubility of conventional lignite is about 68 percent in alkali, whereas leonardite has a solubilty of about 85 percent. All proportions herein are by weight. A typical leonardite having 85 percent solubility consists of 13.5 percent moisture, 71.5 percent humic acids, and 15 percent residue, whereas lignite of 67.7 percent solubility may have an analysis of 15 percent moisture, 51.7 percent humic acid, and 33.3 percent residue. Leonardite is a soft, earthy, medium brown, coal-like substance associated with lignitic outcrops in North Dakota, South Dakota, Montana and Texas, and is mined commercially. Normal lignite may be converted to a material of similar properties by oxidation and such converted lignite may be used in the preparation of the compositions of this invention. Leonardite has an oxygen content higher than that of other types of lignite, generallly about 28 percent to 29 percent oxygen as compared to 10 percent to 20 percent oxygen as compared to 10 percent to 20 percent oxygen in lignite. The higher oxygen content of leonardite is due to the larger number of carboxylic acid groups, which may explain the great increase in alkali solubility of leonardite as compared to other lignites.

Combination of Drilling Fluid Additives and Drilling Fluids

The chromium acetate and sulfoalkylated tannins may be dry blended in weight ratio from about 1:20 to about 1:1, preferably within the weight ratio of from about 1:7 to about 1:1.

The weight proportions of sulfoalkylated tannin to non-sulfoalkylated lignite is generally in the range from about 1:99 to about 99:1, usually from about 10.90 to about 90:10, preferably from about 30:70 to about 80:20. In a preferred embodiment, the weight ratio of sulfoalkylated tannin to lignite is in the range of from about 1:1 to about 2:1.

The amounts of the 2- and 3-component additives of the invention (chromium acetate, sulfoalkylated tannin and optionally lignite) used in drilling fluids in accordance with the invention will vary from well to well depending upon conditions encountered in the drilling of the well, the characteristics of the particular drilling fluid being used, the formations being drilled, etc. For example, as the drilling of the well progresses and the well becomes deeper and temperatures in the well increase, or the drilling fluid becomes contaminated, more additive will usually be required because of said increased temperatures and/or contamination. While the amount of additive used is not of the essence in the invention, it can be stated that the amount of the 3-component additive used will normally be within the range of about 0.1 to about 30, preferably about 0.5 to about 20 and more preferably about 1 to about 10, pounds per barrel, (42 US gallon) of drilling fluid.

The 2- and 3-component additives of this invention are particularly effective in providing thinning action by reducing at least one of the properties (a) plastic viscosity, (b) yield point, (c) shear strength, (d) water loss due to filtration and (e) 10-minute gel strength of drilling fluids contaminated with cement, gypsum or salt, and/or utilized at elevated temperatures, as shown by the examples herein.

The inventive additive composition can be provided in a powdered or flaked form by dry blending lignite, sulfoalkylated tannin, and chromium acetate. The dry blend may also be formed by admixing flaked lignite into a tannin solution before or after sulfoalkylation and drying the resulting mixture in a drum dryer then admixing dry chromium acetate therein.

The additives of this invention are readily dispersable in the water phase of aqueous drilling fluids. The additive can be incorporated into the drilling fluids during the fluids formulation or admixed into a circulating system of drilling fluid.

EXAMPLE I

This example compares the effectiveness of a sulfomethylated quebracho (SMQ)/trivalent chromium (III) acetate blaned as a drilling mud thinner to other SMQ/chromium compound blends in fresh water and NaCl water muds. The SMQ/sodium dichromate blend was included in the Example because it is very effective and commonly used thinner composition.

In these preliminary tests, SMQ and a chromium compound were added to 280 ml aliquots of 12.2 ppg P95B5F mud while stirring on a Hamilton Beach (hb) mixer. The mud was transferred to a Multi-mixer and stirred 20 minutes. The pH of all samples was adjusted to 10.5±0.1 by adding NaOH solution (1 ml=0.5 g) while the samples were stirred. The samples were aged 16 hours in an oven at 176° F. and cooled to room temperature and stirred 2 minutes on Multi-mixer (MM) and tested according to API procedure RP-13 B. They were contaminated with 2 ppb NaCl and stirred 20 minutes before aging 16 hours at 176° F. The aged samples were cooled to room temperature, stirred 2 minutes and tested again according to API procedure RP-13 B. Test results are shown in Table I.

TABLE I

Chromic Compounds as Dichromate Replacements in Thinner Composition: Preliminary Tests

| Chromium Compound | ppb$^a$ | Uncontaminated | | Contaminated with NaCl | | |
| --- | --- | --- | --- | --- | --- | --- |
| | | PV$^b$/YP$^c$ | Gels$^d$ | PV/YP | Gels | WL$^e$ |
| Base Mud* | — | 29/20 | 3/38 | Too Thick to Measure | | |
| All muds below were treated with 3.5 ppb SMQ | | | | | | |
| Sodium Dichromate | 0.50 | 26/2 | ⅜ | 29/9 | 3/9 | 5.7 |
| Chromium Acetate | 0.50 | 26/1 | 2/2 | 24/12 | 3/21 | 6.2 |
| | 0.81 | 27/0 | 2/2 | 26/7 | 2/8 | 6.1 |
| Chromium Carbonate | 0.50 | 24/18 | 12/34 | 25/72 | 46/73 | 7.4 |
| Chromium Chloride | 0.50 | 25/8 | 3/19 | 25/36 | 27/61 | 6.9 |
| | 0.81 | 25/7 | 2/12 | 25/27 | 18/47 | 7.2 |
| Chromium Nitrate | 0.50 | 24/11 | 4/23 | 26/74 | 44/78 | 7.4 |
| | 0.81 | 26/8 | 3/20 | 27/58 | 37/73 | 6.7 |
| Chromium Sulfate | 0.75 | 27/5 | 2/5 | 27/22 | 12/40 | 6.7 |
| Chromium Potassium Sulfate | 0.75 | 25/9 | 3/13 | 26/44 | 33/61 | 6.9 |

TABLE I-continued

Chromic Compounds as Dichromate Replacements in Thinner Composition:
Preliminary Tests

| Chromium Compound | ppb$^a$ | Uncontaminated PV$^b$/YP$^c$ | Gels$^d$ | Contaminated with NaCl PV/YP | Gels | WL$^e$ |
|---|---|---|---|---|---|---|
| Chromium Oxide | 0.50 | 27/16 | 13/36 | 23/88 | 57/99 | 7.5 |

*Base Mud - 12.2 ppg P95B5F mud (47 g bentonite, 235 g P95 illite clay and 562 g barite per 1000 ml of deionized water).
$^a$ppb represents lbs/bbl
$^b$PV represents plastic viscosity in centipoise
$^c$YP represents yield point in lb/100 ft.$^2$
$^d$Gels represents gel strength in lb/100 ft.$^2$, 10 sec. and 10 min.
$^e$WL represents water loss in ml/30 minutes.

As is apparent from the YP and Gels values, chromium acetate is the only effective replacement for sodium dichromate. YP and Gels values increased considerably upon contamination with NaCl in all muds except the sodium dichromate and chromium acetate treated muds.

EXAMPLE II

This example presents comparisons of a 7:1 SMQ/sodium dichromate blend with 7:1 and 4:1 SMQ/chromium (III) acetate blends in NaCl water muds and at high temperatures in fresh water muds. The SMQ/sodium dichromate blend was selected for this comparison because it is a commonly used and very effective thinner composition.

SMQ and a chromium compound were added to 280 ml aliquots of mud and stirred 20 minutes on a Multimixer. The pH of fresh water mud samples was adjusted to 10.5±0.1. All samples were aged 16 hours at 176° F., cooled to room temperature, stirred 2 minutes on MM and tested according to API procedure RP-13 B. The fresh water mud samples were then aged 16 hours at 300° F. in brass bombs, cooled, stirred 5 minutes according to the above procedure, and retested. The test results are shown in Table II.

TABLE II

Chromium Acetate as Dichromate Replacement in Thinner Compositions:
Tests in Fresh Water and Salt Water Muds

| Additive | ppb$^a$ | Aged 16 hrs at 176° F. | | | | Aged 16 hrs at 300° F. | | |
|---|---|---|---|---|---|---|---|---|
| | | PV$^b$/YP$^c$ | Gels$^d$ | WL$^e$ | SS$^f$ | PV/YP | Gels | WL |
| A. Tests in Fresh Water Mud* | | | | | | | | |
| Base Mud | — | 28/14 | 3/22 | 7.8 | 260 | 29/34 | 30/65 | 8.8 |
| 7:1 SMQ/na Dichromate | 1.0 | 24/6 | ½ | 7.4 | 140 | 23/13 | 5/20 | 8.7 |
| 7:1 SMQ/na Dichromate | 2.0 | 25/4 | ½ | 7.3 | 130 | 27/11 | 3/5 | 8.0 |
| 7:1 SMQ/Cr Acetate | 1.0 | 24/6 | ½ | 7.8 | 150 | 25/14 | 6/18 | 8.6 |
| 7:1 SMQ/Cr Acetate | 2.0 | 24/5 | ½ | 7.8 | 120 | 24/7 | 3/7 | 8.1 |
| B. Tests in 5% NaCl Water Mud** | | | | | | | | |
| Base Mud | — | 16/21 | 10/17 | 19.8 | | | | |
| 7:1 SMQ/na Dichromate | 1.0 | 18/16 | 8/14 | 16.6 | | | | |
| 7:1 SMQ/Cr Acetate | 1.0 | 15/13 | 7/14 | 16.8 | | | | |
| 4:1 SMQ/Cr Acetate | 1.0 | 15/14 | 6/12 | 17.0 | | | | |
| C. Tests in Saturated NaCl Water Mud*** | | | | | | | | |
| Base Mud | — | 39/129 | 47/60 | 54.0 | | | | |
| 7:1 SMQ/na Dichromate | 2.0 | 18/29 | 13/20 | 59.0 | | | | |
| 7:1 SMQ/Cr Acetate | 2.0 | 20/23 | 12/17 | 52.0 | | | | |
| 4:1 SMQ/Cr Acetate | 2.0 | 21/25 | 15/19 | 50.0 | | | | |

*Fresh Water Mud - See corresponding footnote in Table 1.
**5% NaCl Water Mud - 42.6 g. attapulgite, 100 g Rev Dust and 4.3 g Drispac ® Regular (high molecular weight cellulosic polymer) per 1000 ml of 5% NaCl water
***Saturated NaCl Water Mud - 71.5 g attapulgite, 36.5 g P95 illite clay, and 7.3 g Drispac ® Regular per 1000 ml of saturated NaCl water
See footnote a in Table I
See footnote b in Table I
See footnote c in Table I
See footnote d in Table I
See footnote e in Table I
$^f$ SS represents shear strength lb/100 ft$^2$ In fresh water mud, the 7:1 SMQ/chromium acetate blend and the 7:1 SMQ/sodium dichromate blend gave about the same YP and Gels values. These results that the 7:1 SMQ/chromium acetate blend is as effective as the conventional 7:1 SMQ/sodium dichromate blend. Similarly, chromium acetate blends and the sodium dichromate blend were almost equally effective in 5% NaCl water and saturated NaCl water muds.

EXAMPLE III

This examples presents comparisons of the 7:1 SMQ/sodium dichromate blend with 7:1 and 4:1 SMQ/chromium (III) acetate blends at high temperatures in fresh water muds contaminated with salt, gypsum or lime.

The procedures for the contaminated mud tests are the same as those in the preliminary tests of Example I except the contained muds were also tested after aging 16 hours at 300° F. The results are shown in Table III.

TABLE III

Chromium Acetate as Dichromate Replacement in Thinner Composition: Tests in Fresh Water Mud Contaminated with Salt, Gypsum or Lime

| Additive | ppb[a] | Aged 16 hrs at 176° F. PV[b]/YP[c] | Gels[d] | WL[e] | SS[f] | Aged 16 hrs at 300° F. PV/YP | Gels |
|---|---|---|---|---|---|---|---|
| A. Tests in 12.2 ppg P95B5F Mud Contaminated with 2 ppb Salt* | | | | | | | |
| Base Mud | — | Too Thick to Measure | | | | | |
| 7:1 SMQ:na Dichromate | 4.0 | 29/9 | 3/9 | 5.7 | 110 | 33/35 | 10/58 |
| 7:1 SMQ:Cr Acetate | 4.0 | 24/12 | 3/21 | 6.2 | 135 | 30/36 | 16/58 |
| 4:1 SMQ:Cr Acetate | 4.3 | 26/7 | 2/8 | 6.1 | 113 | 30/21 | 6/47 |
| B. Tests in 12.2 ppg P95B5F Mud Contaminated with 2 ppb Gypsum* | | | | | | | |
| Base Mud | — | 20/118 | 87/109 | — | — | — | — |
| 7:1 SMQ:na Dichromate | 4.0 | 30/11 | 4/10 | 6.7 | 120 | 28/7 | 3/11 |
| 7:1 SMQ:Cr Acetate | 4.0 | 27/10 | 4/26 | 6.4 | 120 | 23/17 | 5/34 |
| 4:1 SMQ:Cr Acetate | 4.3 | 29/7 | 3/13 | 6.0 | 98 | 26/9 | 3/16 |
| C. Tests in 12.2 ppg P95B5F Mud Contaminated with 2 ppb Lime* | | | | | | | |
| Base Mud | — | Too Thick to Measure | | — | — | — | — |
| 7:1 SMQ:na Dichromate | 4.0 | 29/4 | 2/2 | 6.1 | 103 | 26/7 | |
| 7:1 SMQ:Cr Acetate | 4.0 | 32/5 | | 6.4 | 135 | 31/9 | |
| 4:1 SMQ:Cr Acetate | 4.3 | 32/4 | 2/2 | 6.0 | 117 | 26/6 | |

*NaCl, gypsum, and lime contaminated mud were prepared, by adding 2 lb/bbl NaCl, CaSO$_4$.2H$_2$O and Ca(OH)$_2$, respectively, to uncontaminated mud aged 16 hours at 176° F.
See footnote a in Table I
See footnote b in Table I
See footnote c in Table I
See footnote d in Table I
See footnote e in Table I
See footnote f in Table II The 7:1 SMQ/chromium acetate blend was slightly less effective than the 7:1 SMQ/sodium dichromate blend for resisting the effects of NaCl, gypsum and lime contaminations. This is apparent from higher SS,YP and gels values in muds that were treated with the 7:1 blend. The 4:1 SMQ/chromium acetate blend performed as well a the 7:1 SMQ/sodium dichromate blend in all tests.

EXAMPLE IV

This example presents a comparison of performance for SMQ, caustic lignite, chromium (III) acetate, and sodium dichromate alone and in combination as 2- and 3- component systems at varying concentrations in fresh water mud.

Sodium hydroxides solution approximately 0.024 ml (1 ml=0.5 g) was added to 280 ml aliquots of the base mud while stirring on a Hamilton Beach (hb) mixer. The material to be tested was added while stirring on an hb mixer. The mud was transferred to a Multi-mixer and stirred 20 minutes before testing at room temperature. The samples were aged 16 hours at 176° F., cooled to room temperature, stirred for 2 minutes on a Multi-mixer, and retested. The results are shown in Table IV.

TABLE IV

One, Two and Three Component Thinner Compositions: Comparison in Fresh Water Muds

| Additive | ppb[a] | Room Temperature PV[b]/YP[c] | Gels[d] | Aged 16 hrs at 176° F. PV/YP | Gels |
|---|---|---|---|---|---|
| Base Mud* | | 52/56 | 48/87 | 50/72 | 23/68 |
| SMQ | 0.5 | 44/26 | 8/46 | 58/31 | 6/13 |
| Lignite [e] | 0.5 | 46/35 | 37/72 | 57/45 | 8/29 |
| Chromium Acetate | 0.5 | 48/15 | 7/53 | 64/105 | 92/121 |
| 50:50 SMQ/Chromium Acetate | 0.5 | 45/24 | 4/20 | 54/24 | 2/6 |
| 90:10 SMQ/Chromium Acetate | 0.5 | 45/23 | 6/38 | 57/29 | 4/8 |
| 95:5 SMQ/Chromium Acetate | 0.5 | 43/25 | 9/46 | 57/33 | 5/9 |
| 50:50 Lignite/Chromium Acetate | 0.5 | 45/30 | 20/68 | 55/35 | 12/40 |
| 90:10 Lignite/Chromium Acetate | 0.5 | 49/36 | 26/67 | 58/46 | 7/21 |
| 95:5 Lignite/Chromium Acetate | 0.5 | 46/37 | 30/73 | 57/48 | 7/21 |
| 50:50 SMQ/Lignite | 0.5 | 48/31 | 8/49 | 59/38 | 6/14 |
| 75:25 SMQ/Lignite | 0.5 | 44/31 | 8/48 | 54/43 | 5/11 |
| 40:40:20 SMQ/Lignite/Chromium Acetate | 0.5 | 44/27 | 6/41 | 60/31 | 5/9 |
| 60:20:20 SMQ/Lignite/Chromium Acetate | 0.5 | 42/26 | 5/36 | 54/34 | 2/5 |

*Base Mud - 1366 g bentonite, 1490 g p95 clay, 5100 g barite in 15,000 mL deonized water.
See footnote a in Table I
See footnote b in Table I
See footnote c in Table I
See footnote d in Table I
[e] The lignite used in this invention was causticized.

As can be seen from Table IV, the SMQ/chromium acetate blend is a more effective thinner than either component alone. Also, the three component system of SMQ, lignite, and chromium acetate is as effective as the two component system of SMQ and chromium acetate. Furthermore, the two and three component systems are effective thinners at the full range of concentration ratios shown.

That which is claimed is:

1. A drilling fluid additive comprising a mixture of: (a) a sulfoalkylated tannin and (b) chromium acetate selected from the group consisting of chromium (III) acetate and chromium (II) acetate, wherein said chromium acetate is present in a weight ratio of said chromium acetate to said sulfoalkylated tannin in the range of from about 1:20 to about 1:1.

2. A drilling fluid additive according to claim 1 wherein said sulfoalkylated tannin has been heat treated.

3. A drilling fluid additive according to claim 1 wherein said sulfoalkylated tannin is sulfomethylated quebracho.

4. A drilling fluid additive according to claim 1 having additionally admixed therewith a non-sulfoalkylated lignite.

5. A drilling fluid additive as described in claim 4 wherein the non-sulfoalkylated lignite is causticized.

6. A drilling fluid additive as described in claim 5 wherein the weight ratio of
(a) chromium acetate to sulfoalkylated tannin is in the range of from about 1:20 to about 1:1;
(b) sulfoalkylated tannin to non-sulfoalkylated lignite is in the range of from about 10:90 to about 90:10.

7. A composition according to claim 6 wherein the sulfoalkylated tannin is sulfomethylated quebracho.

8. A composition according to claim 6 wherein said non-sulfoalkylated causticized lingnite is leonardite.

9. An aqueous drilling fluid which comprises the drilling fluid additive of claim 1.

10. In a process for the drilling of a well with rotary tools while circulating a stream of aqueous drilling fluid through said well, the improvement which comprises circulating the drilling fluid of claim 9 through said well.

* * * * *